United States Patent
Zogg, Jr. et al.

(10) Patent No.: US 11,077,585 B2
(45) Date of Patent: Aug. 3, 2021

(54) SYSTEM FOR PROCESSING OF LOW VISCOSITY POLYMERS

(71) Applicant: DOW GLOBAL TECHNOLOGIES LLC, Midland, MI (US)

(72) Inventors: Michael J. Zogg, Jr., Freeport, TX (US); Timothy W. Gambrel, Freeport, TX (US); Johan Van Leeuwen, Freeport, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 773 days.

(21) Appl. No.: 15/535,792

(22) PCT Filed: Dec. 10, 2015

(86) PCT No.: PCT/US2015/064880
§ 371 (c)(1),
(2) Date: Jun. 14, 2017

(87) PCT Pub. No.: WO2016/100060
PCT Pub. Date: Jun. 23, 2016

(65) Prior Publication Data
US 2017/0368716 A1    Dec. 28, 2017

Related U.S. Application Data

(60) Provisional application No. 62/093,660, filed on Dec. 18, 2014.

(51) Int. Cl.
*B29B 9/06* (2006.01)
*B29C 48/285* (2019.01)
(Continued)

(52) U.S. Cl.
CPC .......... *B29B 9/065* (2013.01); *B29C 48/285* (2019.02); *B29C 48/365* (2019.02); *B29C 48/37* (2019.02); *B29C 48/695* (2019.02); *B29C 48/78* (2019.02)

(58) Field of Classification Search
CPC .......... B29C 9/065; B29C 9/06; B29C 48/37; B29C 48/36; B29C 48/78; B29C 48/285; B29C 48/695; B29C 48/365; B29B 9/065
See application file for complete search history.

(56) References Cited

U.S. PATENT DOCUMENTS 3,544,525 A * 12/1970 Ramon ............. F26B 5/08
528/483
2007/0284771 A1  12/2007 Boothe et al.
(Continued)

FOREIGN PATENT DOCUMENTS

| CH | 694291 A5 | 11/2004 |
|---|---|---|
| EP | 2033753 A2 | 3/2009 |
| IN | 259188 B | 3/2014 |

OTHER PUBLICATIONS

International Search Report for International Application No. PCT/US2015/064880; International Filing Date Dec. 10, 2015; dated Mar. 17, 2016, 7 pages.
(Continued)

*Primary Examiner* — Seyed Masoud Malekzadeh
(74) *Attorney, Agent, or Firm* — Cantor Colburn LLP

(57) ABSTRACT

Disclosed herein is a system comprising a first pump; a pelletization system that comprises an underwater pelletizer; where the pelletization system is located downstream of the first pump and is in fluid communication with it; a direct line that is located downstream of the first pump and upstream of the pelletization system; where the direct line does not contain a pump or a heat exchanger; and a bypass line that is located downstream of the first pump and upstream of the
(Continued)

pelletization system; where the bypass line comprises a second pump; where the first pump is operative to discharge the polymer to the pelletization system via the direct line when the polymer has a melt viscosity greater than $10^5$ centipoise; and where the first pump is operative to discharge the polymer to the pelletization system via the bypass line when the polymer has a melt viscosity less than $10^5$ centipoise.

7 Claims, 2 Drawing Sheets

(51) Int. Cl.
    *B29C 48/365*      (2019.01)
    *B29C 48/78*      (2019.01)
    *B29C 48/695*      (2019.01)
    *B29C 48/37*      (2019.01)

(56) References Cited

U.S. PATENT DOCUMENTS

| | | | |
|---|---|---|---|
| 2009/0062427 A1* | 3/2009 | Tornow | B29B 9/065 523/223 |
| 2009/0110833 A1* | 4/2009 | Wright | B29B 7/748 427/299 |
| 2009/0115091 A1* | 5/2009 | Eloo | B29C 48/92 264/141 |
| 2009/0121372 A1 | 5/2009 | Campbell et al. | |
| 2009/0203840 A1* | 8/2009 | Martin | B29B 7/7485 525/50 |
| 2009/0273112 A1 | 11/2009 | Boothe et al. | |
| 2011/0116975 A1* | 5/2011 | Persinger | B29C 48/37 422/108 |
| 2012/0084993 A1* | 4/2012 | Martin | B29B 9/16 34/359 |
| 2012/0280419 A1 | 11/2012 | Martin et al. | |
| 2012/0299210 A1 | 11/2012 | Nising | |
| 2012/0319318 A1 | 12/2012 | Wang et al. | |
| 2014/0144573 A1 | 5/2014 | Blok et al. | |
| 2017/0129976 A1 | 5/2017 | Kolthammer et al. | |

OTHER PUBLICATIONS

Written Opinion for International Application No. PCT/US2015/064880; International Filing Date Dec. 10, 2015; dated Mar. 17, 2016, 7 pages.

Zhou et al.; "Polymer Materials Molding Processing";China Light Industry Press;May 2000;4 pages.

* cited by examiner

SYSTEM FOR PROCESSING OF LOW VISCOSITY POLYMERS

CROSS REFERENCE TO RELATED APPLICATIONS

This application is a National Stage application of PCT/US2015/064,880, filed Dec. 10, 2015, which claims the benefit of U.S. Provisional Application No. 62/093,660, filed Dec. 18, 2014, both of which are incorporated by reference in their entirety herein.

BACKGROUND

This disclosure relates to a system for the processing of low viscosity polymers.

Low viscosity polymeric manufacturing systems are often used to handle both low viscosity solution polymers (polymers that are in a solution and therefore have a low viscosity) or low viscosity melt polymers (polymers that are used in applications that necessitate low melt viscosities without any solvent—e.g., adhesives such as hot melt adhesives). The system is interchangeable—i.e., it can handle low viscosity solution polymers and low melt viscosity polymers using a slight adjustment of the system. In other words (as detailed below), the lines are changed when processing a low viscosity solution polymer versus a low melt viscosity polymer.

FIG. 1 is a prior art system 100 for processing both traditional, high viscosity polymers (hereinafter high viscosity polymers) where the polymer has a melt viscosity in excess of $10^5$ centipoise (typically measured as a melt mass flow rate via ASTM D1238) as well as polymers that have low melt viscosity of less than $10^5$ centipoise as measured by ASTM D1084. The low viscosity melt polymers may or may not contain any solvents.

In the FIG. 1, a polymeric solution is discharged from a reactor 102 to a heat exchanger 104. The heat exchanger 104 is located downstream of the reactor 102 and heats up the solution for devolatilization of the solvent and unreacted species in a devolatilizer 106 that is located downstream of the heat exchanger 104. The devolatilizer 106 (or a plurality of devolatilizers) is/are operative to reduce the amount of solvent by over 99% of the amount of solvent present in the polymeric solution. The polymer is then pumped by a pump 108 located downstream of the devolatilizer 106 to an underwater pelletizer 204. The pellets obtained from the underwater pelletizer are dried in a drier 206 and the water obtained as a result of the drying is pumped by a pump 208 into a heat exchanger 210 where it is cooled and recycled to the pelletizer 204.

The valves 110, 112 and 120 may be used to control the flow of the polymer melt through the system. The valves are used to make the system interchangeable—i.e., by opening the valve 110 and closing the valves 112 and 120, the polymer melt from the devolatilizer is transported directly to the underwater pelletizer, 204. This configuration is generally deployed when it is desirable to pelletize polymers having melt viscosities exceeding $10^5$ centipoise. When valve 110 is closed and valves 112 and 120 are opened, the polymer is transported through the heat exchanger 116 where it is cooled, increasing the melt viscosity to facilitate underwater pelletization. This configuration is deployed when it is desired to pelletize polymers that have low melt viscosities (lower than $10^5$ centipoise).

When the system 100 is used for pelletizing polymers (i.e., where the polymer has a melt viscosity exceeding $10^5$ centipoise) the polymeric solution is pumped from the devolatilizer 106 to the underwater pelletizer 204 along the line 302 and 304 to the pelletizer 204. When low melt viscosity polymers (i.e., where the polymer has a melt viscosity less than $10^5$ centipoise) are pelletized, they are pumped along lines 302, 308 and 310 to a heat exchanger 116. The heat exchanger 116 cools the polymer and discharges it to the underwater pelletizer 204 and cut the polymer into pellets. This method of pelletizing the low viscosity polymer has some drawbacks. One drawback is that commercially available polymer pumps located downstream of the devolatilizer 106 cannot generate the pressure on the low viscosity polymer to charge the heat exchanger 116 and the underwater pelletizer die at the appropriate pressures that are used in underwater pelletization. It has been determined that the polymer pump 108 cannot be designed to pump both polymers with a mass melt flow rate as low as 0.5 dg/min as well as the low viscosity polymers with sufficient pressure (e.g., >200 pounds per square inch gauge (psig)) to hydraulically fill an underwater pelletizer die for proper cutting and granulation without mechanically damaging the pump.

It is therefore desirable to design an interchangeable system that can handle a broad range of polymer melt viscosities to provide the desired pressure (through the heat exchanger 116) to facilitate proper cutting in the underwater pelletizer 204 and granulation without mechanically damaging the pump.

SUMMARY

Disclosed herein is a system comprising a first pump; a pelletization system that comprises an underwater pelletizer; where the pelletization system is located downstream of the first pump and is in fluid communication with it; a direct line that is located downstream of the first pump and upstream of the pelletization system; where the direct line does not contain a pump or a heat exchanger; and a bypass line that is located downstream of the first pump and upstream of the pelletization system; where the bypass line comprises a second pump; where the first pump is operative to discharge the polymer to the pelletization system via the direct line when the polymer has a melt viscosity greater than $10^5$ centipoise; and where the first pump is operative to discharge the polymer to the pelletization system via the bypass line when the polymer has a melt viscosity less than $10^5$ centipoise.

Disclosed herein too is a method comprising discharging a polymer from a first pump to a pelletization system that comprises an underwater pelletizer; where the pelletization system is located downstream of the first pump and is in fluid communication with it; where the polymer is discharged via a direct line located downstream of the first pump and upstream of the pelletization system when the polymer has a melt viscosity greater than $10^5$ centipoise; where the direct line does not contain a pump or a heat exchanger; or where the polymer is discharged via a bypass line that is located downstream of the first pump and upstream of the pelletization system when the polymer has a melt viscosity less than $10^5$ centipoise; where the bypass line comprises a second pump; and pelletizing the polymer.

DETAILED DESCRIPTION

Figure 1:
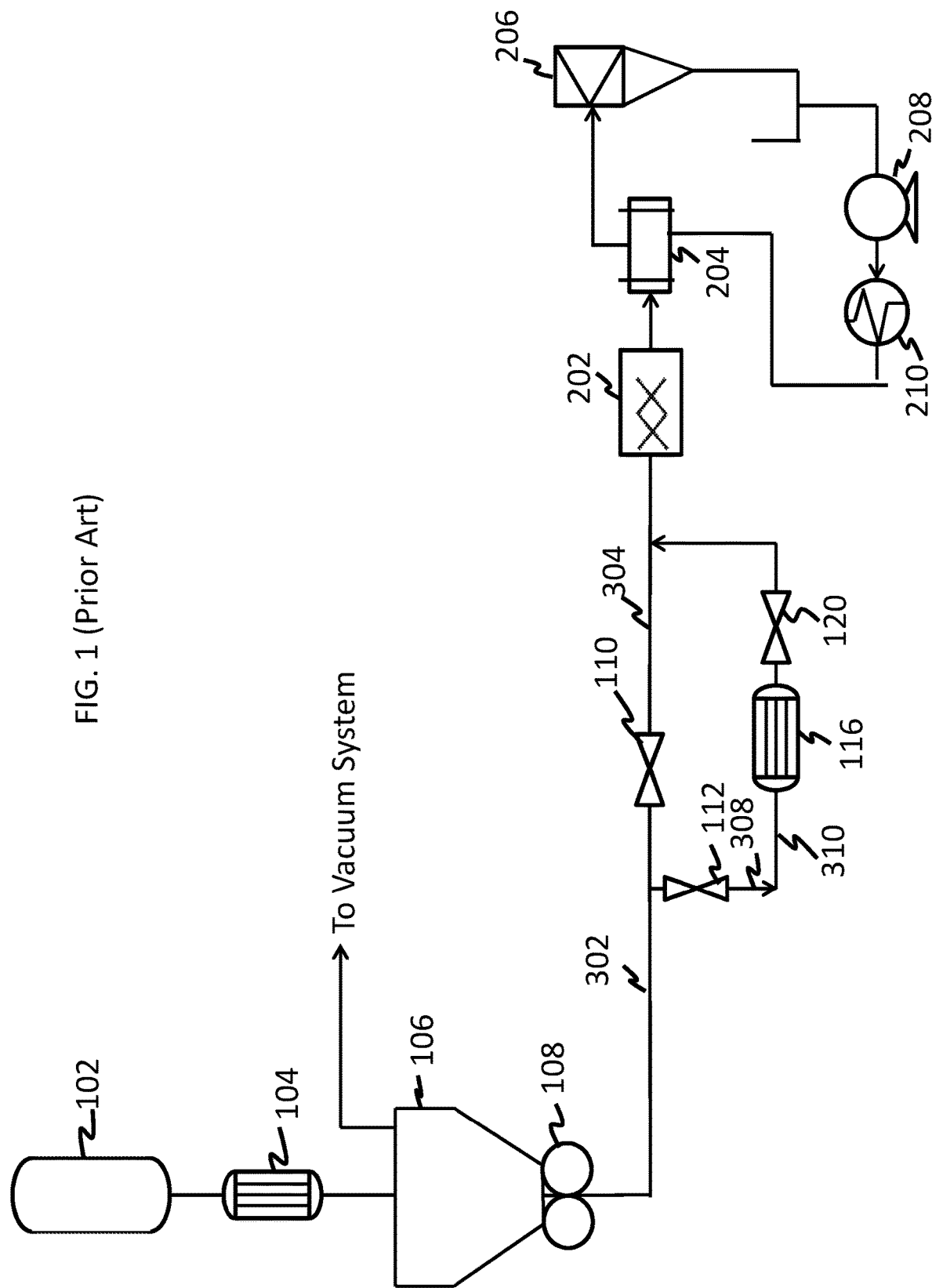
FIG. 1 is a prior art system for processing polymer that has a direct line for processing melt viscosities greater than $10^5$ centipoise with a bypass line for processing polymers with viscosities between $10^{3.9}$ and $10^5$ centipoise.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The transition term "comprising" encompasses the transition terms "consisting of" and "consisting essentially of".

Various numerical ranges are disclosed herein. These ranges are inclusive of the endpoints as well as numerical values between these endpoints. The numbers in these ranges are interchangeable.

The term "line" as used herein refers to flow path between two points. The flow path may include a conduit, a pipe, a hose, or the like.

The term "and/or" includes both "and" as well as "or". For example "A and/or B" includes "A", "B", or "A and B".

Disclosed herein is an interchangeable system for pelletizing both low melt viscosity polymers and high melt viscosity polymers. The system uses a plurality of pumps that are in series with one another to raise the polymer pressure to a sufficient value to be fed to an underwater pelletizer. The plurality of pumps are located downstream of a devolatilizer and upstream of the underwater pelletizer. The system configuration is advantageous in that it permits a portion of the system to be deployed for pelletizing high melt viscosity polymers and another portion of the system to be deployed for pelletizing low melt viscosity polymers while generating sufficient pressure on the low viscosity polymer to charge a die immediately upstream of the underwater pelletizer at the appropriate pressures that are used in underwater pelletization.

The system described herein may be used in any type of polymerization process employing one or more monomers. Examples of monomers include unsaturated hydrocarbons having from 2 to 30 carbon atoms, preferably 2 to 12 carbon atoms, and more preferably 2 to 8 carbon atoms. Useful monomers include linear, branched or cyclic olefins; linear branched or cyclic alpha olefins; linear, branched or cyclic diolefins; linear branched or cyclic alpha-omega olefins; linear, branched or cyclic polyenes; linear branched or cyclic alpha olefins. Particularly preferred monomers include one or more of ethylene, propylene, butene-1, pentene-1,4-methyl-pentene-1, hexene-1, octene-1, decene-1,3-methyl-pentene-1, norbomene, norbomadiene, 3,5,5-trimethyl-1-hexene, 5-ethyl-1-nonene, vinyl norbomene, ethylidene norbomene monomers, or a combination thereof.

In an exemplary embodiment, the polymer produced herein is an ethylene homopolymer or copolymer. In another exemplary embodiment, the process relates to the polymerization of ethylene and one or more $C_4$ to $C_{20}$ linear, branched or cyclic monomers, preferably $C_4$ to $C_{12}$ linear or branched alpha-olefins. In a preferred embodiment, the comonomer comprises at least one comonomer having from 3 to 8 carbon atoms, preferably 4 to 8 carbon atoms.

Particularly, the comonomers are propylene, butene-1,4-methyl-pentene-1,3-methyl-pentene-1, hexene-1 and octene-1, the most preferred being hexene-1, butene-1 and/or octene-1.

Figure 2:
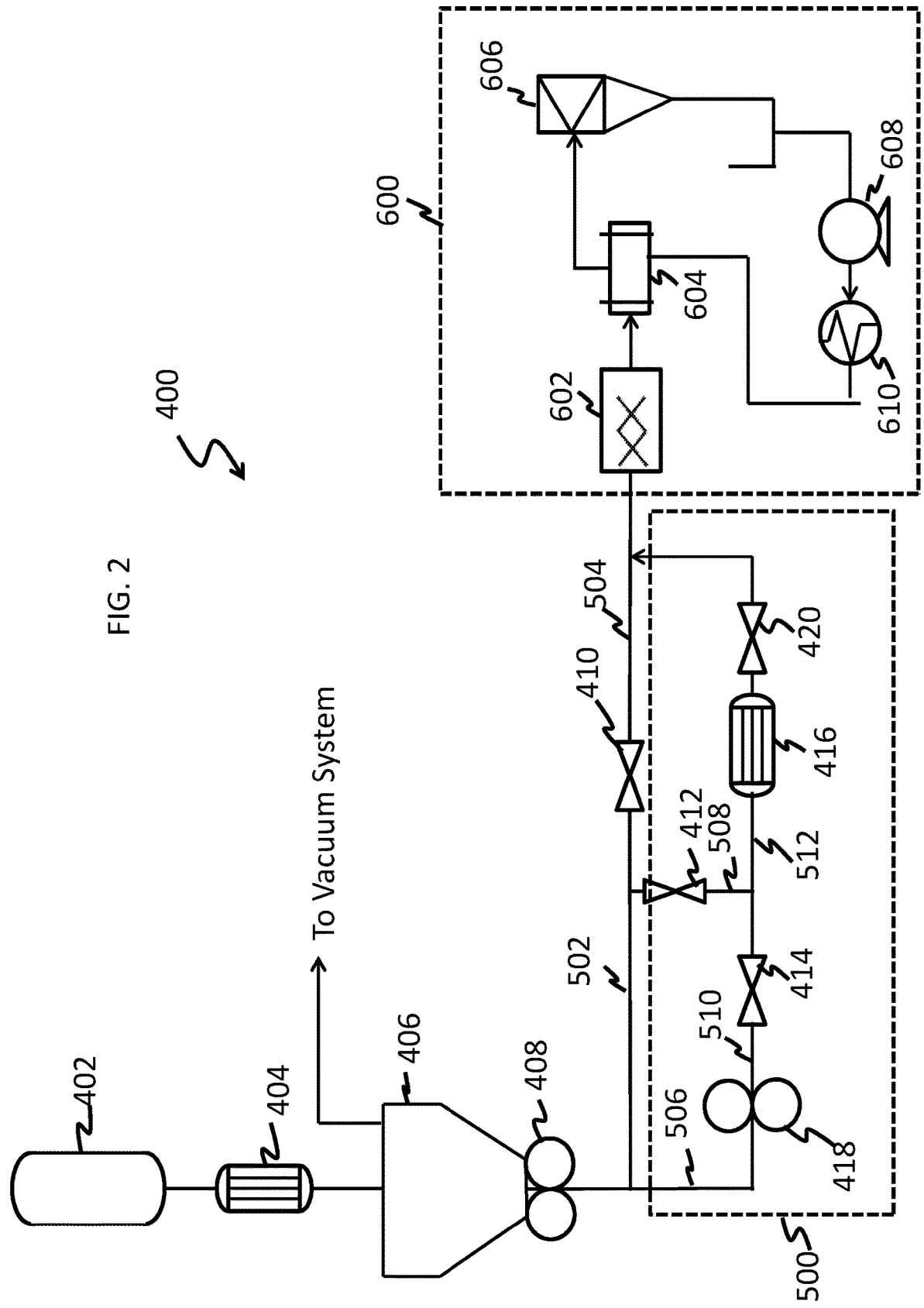
FIG. 2 is a depiction of an interchangeable system for processing polymers that contain polymers that have melt viscosities greater than $10^5$ centipoise as well as low viscosity polymers that have melt viscosities less than $10^{3.9}$ centipoise.

FIG. 2 depicts a system 400 that comprises a reactor 402 in which polymers having different molecular weights are synthesized. The polymer molecular weights can result in the polymer having a melt viscosity of less than 8,000 centipoise to above 100,000,000 centipoise.

The reactor 402 lies upstream of a heat exchanger 404, a devolatilizer 406, a first pump 408, a direct line comprising lines 502 and 504, a pressurization system 500 that includes a bypass line comprising lines 506, 510 and 512, and a pelletization system 600. The direct line contains no pumps or heat exchangers. The bypass line contains a second pump 418 and a heat exchanger 416. All of the components detailed in the FIG. 2 are in fluid communication with one another.

The heat exchanger 404 is located downstream of the reactor 402 and is operative to heat a polymeric solution that is discharged from the reactor 402. The heat exchanger generally heats the polymeric solution to a temperature of 225 to 275° C. In a preferred embodiment, the heat exchanger generally heats the polymeric solution or the low viscosity polymer to a temperature of 240 to 250° C.

The devolatilizer 406 is located downstream of the heat exchanger 404 and is operative to extract solvent from the polymeric solution. The polymer after being discharged from the devolatilizer 406 contains less than 1,500 parts per million of solvent. In an embodiment (not shown), the system 400 may contain a plurality of devolatilizers in series with one another. Each successive devolatilizer further reduces the amount of solvent contained in the polymer. The polymer with a reduced amount of solvent is now discharged to first pump 408.

The first pump 408 can be a rotary lobe pump, progressive cavity pump, rotary gear pump, piston pump, diaphragm pump, screw pump, gear pump, hydraulic pump, rotary vane pump, regenerative (peripheral) pump, or a peristaltic pump. A preferred pump is a gear pump.

The gear pump only acts as an extraction pump and generates low pressure when it is processing polymers with a viscosity less than 8,000 centipoise. For all other grades it generates a pressure that is effective to charge the polymer through the die. When making polymers with a melt mass flow rate equal to 0.5 dg/min the discharge pressure from the first pump 408 can exceed 3,000 psig (greater than 225 kilograms per square centimeter.

In an embodiment, the gear pump is an extraction pump that generates very little discharge pressure (e.g., less than 500 psig (i.e. less than 37.5 kilograms per square centimeter)) while feeding the second pump 418 (also known as the "booster pump", which is discussed in detail below).

The first pump 408 functions as a pump that extracts the polymer from the devolatilizer and discharges it to either the direct line or alternatively to the pressurization system 500 at a pressure of 22 to 235 kilograms per square centimeter. In a preferred embodiment, the first pump 408 functions as a pump that extracts the polymer from the devolatilizer and discharges it to either the direct line or alternatively to the pressurization system 500 at a pressure of 40 to 200 kilograms per square centimeter.

When the polymer has a melt viscosity exceeding $10^5$ centipoise it is discharged along the direct line 502 and 504 to the pelletization system 600. Since the polymer has a high melt viscosity it is discharged from the first pump 408 at a pressure that is adequate to facilitate underwater pelletization.

The direct line comprises lines 502 and 504 that are in series with one another with a valve 410 disposed in line 504. The valve 410 is in the open position when the system is used to process a polymer that has a melt viscosity exceeding $10^5$ centipoise. When the polymer melt viscosity is between $10^{3.9}$ and $10^5$ centipoise valve 410 is closed and valves 412 and 420 are opened. Alternatively for this melt viscosity range valves 410 and 412 can be closed and the polymer emanating from the first pump 408 is discharged via the pressurization system 500. When the polymer has a melt viscosity of less than $10^{3.9}$ centipoise (i.e., the low viscosity polymer), the valves 410 and 412 are closed and the polymer emanating from the first pump 408 is discharged via the pressurization system 500.

The pressurization system 500 comprises a bypass line 510 (that bypasses the direct line) and has disposed along it a second pump 418 that is located downstream of the first pump 408. The first pump 408 and the second pump 418 are in series with one another and work together to increase the pressure on the low viscosity polymer to charge the heat exchanger 416 and the underwater pelletizer die at appropriate pressures that are used in underwater pelletization. The heat exchanger can be shell and tube, flat plate, plate and frame, hairpin with the preferred technology being shell and tube with twisted tape inserts.

Disposed downstream of the second pump 418 is a valve 414 that can be used to stop or to start flow along the bypass line 510. A second heat exchanger 416 is disposed downstream of the second pump 418 and functions to cool the polymer prior to its being charged to the pelletization system 600.

In one embodiment, the bypass system 500 includes a valve 412 that permits use of a part of the direct line 502 and the bypass line 512. This combination may be used, for example, when the viscosity of the polymer does not necessitate charging it to the heat exchanger 416 with pump 418. This combination may also be used, for example, if the low viscosity polymer is low enough that melt cooling is required but the viscosity is high enough (e.g., viscosity exceeding $10^{3.9}$ centipoise) that pump 408 can be used to generate the required pressure for pelletization (system 600) without damaging the pump.

The second pump 418 is a booster pump that pressurizes the low viscosity polymer (e.g., less than $10^{3.9}$ centipoise) to a pressure that is sufficient to be extruded and pelletized in the pelletization system 600. In an embodiment, the booster pump can be a rotary lobe pump, a progressive cavity pump, a rotary gear pump, a piston pump, a diaphragm pump, a screw pump, a gear pump, a hydraulic pump, a rotary vane pump, a regenerative (peripheral) pump, or a peristaltic pump. A preferred pump is a gear pump. The booster pump 418 increases the pressure of the low viscosity polymer to 15 to 150 kilograms per square centimeter. In a preferred embodiment, the booster pump 418 increases the pressure of the low viscosity polymer to 30 to 70 kilograms per square centimeter.

When the polymer has a melt viscosity of less than $10^{3.9}$ centipoise (i.e., the low viscosity polymer), the polymer emanating from the first pump 408 is discharged to the second pump 418 and then to the second heat exchanger 416 from where it is charged to the pelletization system 600. The low viscosity polymer leaves the second heat exchanger 416 at a temperature of 60 to 160° C. and a pressure of 11 to 145 kilograms per square centimeter. In a preferred embodiment, the low viscosity polymer leaves the second heat exchanger 416 at a temperature of 70 to 120° C. and a pressure of 30 to 60 kilograms per square centimeter.

The pelletization system 600 comprises an underwater pelletizer 604, a spin dryer 606, a water circulation pump 608, and a water cooling exchanger 610. The low viscosity polymer (that has a melt viscosity of less than $10^5$ centipoise) or the high viscosity polymer (melt viscosity exceeding $10^5$ centipoise) flow through the die face and to the underwater pelletizer 602. The pellet-water slurry is discharged to the drier 606 where it is dried. Water removed at the drier 606 is recycled to the pelletizer via a pump 608 and a heat exchanger 610. The pellets may then be packaged for sale or subjected to further finishing processes.

In one embodiment, in one manner of using the system 400, a polymer having a melt viscosity of greater than $10^5$ centipoise (and preferably $10^6$ to $10^8$ centipoise) is discharged from the reactor 402 to a devolatilizer 406 via heat exchanger 404. The devolatilizer 406 removes solvent from the polymer solution. A first pump 408 pumps the polymer directly to (via line 502 and 504) to an underwater pelletizer.

In another embodiment, in another manner of using the system 400, a low melt viscosity polymer (having a melt viscosity less than $10^5$ centipoise and preferably 8,000 to 10,000) is discharged from the reactor 402 to a devolatilizer 406 via heat exchanger 404. The devolatilizer 406 removes solvent from the polymer solution. A first pump 408 pumps the polymer to an underwater pelletizer via a bypass line 506, 510 and 512, where it contacts a second pump 418 (also known as a booster pump) that raises its pressure to a value effective to be pelletized in the underwater pelletizer 602. The low viscosity polymer then contacts the heat exchanger 416, where it is cooled to the appropriate temperature and then discharged to the underwater pelletizer where it is pelletized.

As detailed above, the line 508 may be used when it is desired to cool the polymer (having a melt viscosity between $10^{3.9}$ and $10^5$ centipoise) by opening the valve 412 and charging the solution to the heat exchanger 416 before discharging it to the underwater pelletizer 602. In this event, the polymer will travel along lines 502, 508 and 512 before it is discharged to the pelletization system 600 to be pelletized.

In another embodiment, the line 506 may be used when the low viscosity polymer (having a melt viscosity of less than $10^{3.9}$ centipoise) is to be pumped through exchanger 416 and to the underwater pelletizer 602 while utilizing the second pump 418. In this event, the low viscosity polymer will travel along paths 506, 510, and 512 prior to being discharged to the pelletization system 600 to be pelletized.

The system 400 disclosed herein is advantageous in that it may be utilized to process both high melt viscosity polymers as well as a newer class of polymers—low melt viscosity polymers in a single system. The additional second pump 418 may be retrofitted onto an existing system to enable this interchangeability in the system without the expenditure of a large amount of capital.

What is claimed is:

1. A system comprising:
   a first pump;
   a pelletization system that comprises an underwater pelletizer; where the pelletization system is located downstream of the first pump and is in fluid communication with the first pump;
   a direct line that is located downstream of the first pump and upstream of the pelletization system; where the direct line does not contain a pump or a heat exchanger; and
   a bypass line that is located downstream of the first pump and upstream of the pelletization system; where the bypass line comprises a second pump; where the first pump is operative to discharge a polymer to the pelletization system via the direct line when the polymer has a melt viscosity greater than $10^5$ centipoise; where the first pump is operative to discharge the polymer to the pelletization system via the bypass line when the polymer has a melt viscosity less than $10^5$ centipoise,
   wherein the bypass line further comprises a heat exchanger that is configured to cool the polymer; and wherein the heat exchanger is located downstream of the second pump and upstream of the palletization system.

2. The system of claim 1, where the first pump discharges the polymer at a pressure of less than 15 kilograms per square centimeter when the polymer has the melt viscosity greater than $10^5$ centipoise.

3. The system of claim 1, where the second pump discharges the polymer at a pressure of 15 to 150 kilograms per square centimeter when the polymer has a melt viscosity less than $10^{3.9}$ centipoise.

4. The system of claim 1, where the bypass line contacts the direct line via a line that contains a valve.

5. The system of claim 1, further comprising a reactor and a devolatilizer;
   where the reactor and the devolatilizer are disposed upstream of the first pump and where the reactor and the devolatilizer are in fluid communication with one another and with the first pump.

6. The system of claim 5, further comprising a plurality of devolatilizers that remove solvent from the polymer; where the plurality of devolatilizers are in fluid communication with each other.

7. The system of claim 1, where the first pump and the second pump are each a gear pump.

* * * * *